(12) United States Patent
Chakraborty et al.

(10) Patent No.: US 9,268,994 B2
(45) Date of Patent: Feb. 23, 2016

(54) 3D VISUAL PROXEMICS: RECOGNIZING HUMAN INTERACTIONS IN 3D FROM A SINGLE IMAGE

(71) Applicant: SRI International, Menlo Park, CA (US)

(72) Inventors: Ishani Chakraborty, Franklin Park, NJ (US); Hui Cheng, Bridgewater, NJ (US); Omar Javed, Franklin Park, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 221 days.

(21) Appl. No.: 13/967,521

(22) Filed: Aug. 15, 2013

(65) Prior Publication Data

US 2014/0270363 A1   Sep. 18, 2014

Related U.S. Application Data

(60) Provisional application No. 61/787,375, filed on Mar. 15, 2013.

(51) Int. Cl.
*G06K 9/00* (2006.01)
(52) U.S. Cl.
CPC ........ *G06K 9/00248* (2013.01); *G06K 9/00221* (2013.01); *G06K 9/00677* (2013.01)
(58) Field of Classification Search
None
See application file for complete search history.

(56) References Cited

U.S. PATENT DOCUMENTS

| 7,953,546 B1* | 5/2011 | Wall, III ................ G08G 1/081 340/905 |
| 2012/0314935 A1 | 12/2012 | Cheng et al. |
| 2013/0016877 A1* | 1/2013 | Feris .................. G06K 9/00771 382/103 |
| 2013/0215116 A1* | 8/2013 | Siddique et al. .............. 345/420 |

OTHER PUBLICATIONS

Ogden et al., "Robotic Etiquette: Structured Interaction in Humans and Robots," Procs SIRS 2000, 8th Symp on Intelligent Robotic Systems. University of Reading, 2000.*
Edward T. Hall, A System for the Notation of Proxemic Behavior, American Anthropologist, New Series, vol. 65, No. 5, Selected Papers in Method and Technique (Oct. 1963), pp. 1003-1026.
Xiangxin Zhu, et al., Face Detection, Pose Estimation, and Landmark Localization in the Wild, Dept. of Computer Science, University of California, Irvine, 2012.
Proxemics, Wikipedia, accessed Dec. 18, 2013.
Yi Yang, et al., Recognizing Proxemics in Personal Photos, UC Irvine, 2012.
U.S. Appl. No. 61/787,375, filed Mar. 15, 2013.

* cited by examiner

*Primary Examiner* — Shefali Goradia
(74) *Attorney, Agent, or Firm* — Barnes & Thornburg LLP; Thomas J. McWilliams; Edward F. Behm, Jr.

(57) ABSTRACT

A unified framework detects and classifies people interactions in unconstrained user generated images. Previous approaches directly map people/face locations in two-dimensional image space into features for classification. Among other things, the disclosed framework estimates a camera viewpoint and people positions in 3D space and then extracts spatial configuration features from explicit three-dimensional people positions.

13 Claims, 5 Drawing Sheets a. Group interaction b. Family photo c. Group photo d. Couple and audience e. Crowd f. Speaker and audience a. Group interaction b. Family photo c. Group photo d. Couple and audience e. Crowd f. Speaker and audience

3D VISUAL PROXEMICS: RECOGNIZING HUMAN INTERACTIONS IN 3D FROM A SINGLE IMAGE

CROSS-REFERENCE TO RELATED APPLICATIONS

The present application claims the benefit of and priority to U.S. Provisional Application Ser. No. 61/787,375, filed Mar. 15, 2013, which is incorporated herein by this reference in its entirety.

GOVERNMENT RIGHTS

This invention was made in part with government support under contract number D11PC20066 award by the United States Department of the Interior—National Business Center. The Government has certain rights in this invention.

BACKGROUND

A significant number of images and videos uploaded to the Internet, such as YouTube videos or Flickr images, contain scenes of people interacting with people. However, currently there is no automatic method to classify/search these images based on different social interactions and activities. Thus, digital apps cannot automatically sort out or arrange photos in a digital photocollections based on social activities/interactions. In addition, image search engines photos can't search for images with various social activities unless the someone manually provides text tags with the images.

SUMMARY

We present a unified framework called 3D Visual Proxemics Analysis (VPA3D) for detecting and classifying people interactions in unconstrained user generated images. VPA3D first estimates people/face depths in 3D and camera pose, then performs perspective rectification to map people locations from the scene space to the 3D space. The 3D layout is computed by a novel algorithm that robustly fuses semantic constraints into a linear camera model. To characterize human interaction space, we introduce visual proxemes; a set of prototypical patterns to characterize social interactions. Finally, a set of spatial and structural features are used to detect and recognize a variety of social interactions, including people dining together, family portraits, people addressing an audience, etc.

Vast amounts of Internet content captures people-centric events. Detecting and classifying people interactions in images and videos could help us to automatically tag, retrieve and browse large archives using high-level, concept based keywords. Such a representation would support queries such as "find me the video segment where we are walking down the aisle" or "find me the photos where I am curling the birthday cake". Such queries are very hard to be represented using low-level features. To bridge this semantic gap between human defined phrases and image features, we present an intermediate representation using visual proxemes. Briefly the invention can have the following commercial impact: 1) The invention can be used in digital apps to sort out or arrange photos in a digital photocollections. Social networking sites (e.g. Facebook, and Google Picasa photo album) directly benefit from this. 2) The application can aid image search for photos depicting various types of social activities in large image databases. 3) The invention can be used to accurately determine the physical distance between people in a photograph. This information can potentially be used for forensic analysis from photographs or CCD images.

Group behavior based on people tracks has been studied. Due to the accuracy of face detection systems, detected faces are used to localize people and detect their layout in the image. Our contributions vis-à-vis current state-of-the-art is two-fold. First, we localize the explicit 3D positions of people in real world, which improves the understanding of relative distances between people. To achieve an accurate layout, we develop an algorithm that robustly fuses semantic constraints about human interpositions into a linear camera model. Previous work has only considered 2D layout. Additionally, we also compute the camera location and pose to make our solution view invariant; this capability is not present in previous works. Second, we analyze a large number of people configurations and provide statistical and structural features to capture them. Previous work only considered simple posing photoshoots of people.

BRIEF DESCRIPTION OF THE DRAWINGS

This disclosure is illustrated by way of example and not by way of limitation in the accompanying figures. The figures may, alone or in combination illustrate one or more embodiments of the disclosure. Elements illustrated in the figures are not necessarily drawn to scale. Reference labels may be repeated among the figures to indicate corresponding or analogous elements.

DETAILED DESCRIPTION

According to one or more aspects of the present disclosure, three dimensional (3D) proxemics may be used to recognize human interactions in 3D from a single two-dimensional image. A significant number of images and videos uploaded to the Internet, such as YouTube videos or Flickr images, contain scenes of people interacting with people. Studying people interactions by analyzing their spatial configuration, also known as Proxemics in anthropology, is an important step towards understanding web images and videos. However, recognizing human spatial configurations (i.e., proxemes) has received relatively little attention in computer vision, especially for unconstrained user generated content.

Figure 1:
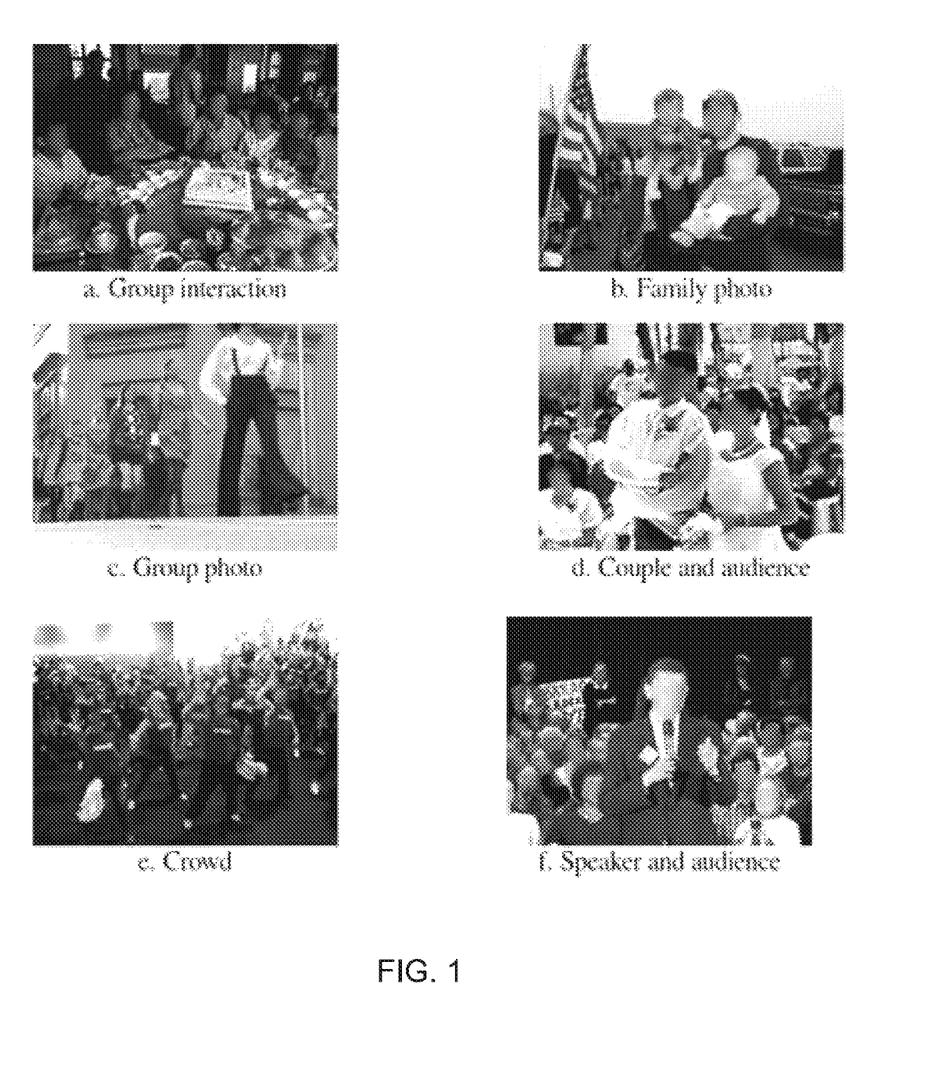
FIG. 1 illustrates a number of exemplary digital images a, b, c, d, e, and f, each depicting a commonly occurring visual proxeme that may be recognized using the techniques disclosed herein.

Referring to FIG. 1, people configurations and the camera-person's perspective provide strong cues about the type of social interaction that the people in the image are participating in. One embodiment of the disclosed method uses two-dimensional face locations from a single image to estimate the camera pose and the spatial arrangement of people in 3D. FIG. 1 shows six typical types of people interactions that are often seen in Internet images and video frames: They are (1) Group Interaction, (2) Family photo, (3) Group photo, (4) Couple with an audience, (5) Crowd, and (6) Speaker with audience. From these images, it is important to note that the people configurations in the 3D space would better reflect the type of interaction than the configurations in a 2D image space. For example, FIGS. 1(a), (d), (e) and (f) all have many faces distributed throughout the image space, but they have very different spatial arrangements that can be distinguished in the 3D space. Additionally, not only how people are organized spatially, but also how the shots are framed (i.e. the relative camera location, direction and pose) convey the type of proxemes depicted in these images. For example, in order to capture the whole group and to avoid occlusion, high-angle shots are used for group interaction (FIG. 1(a)) and crowd (e). On the other hand, to capture the focus of attention, or principals in an event, such as a family portrait (FIG. 1(b)), couples in a ceremony (FIG. 1(d)) and speaker with an audience (FIG. 1(f)), eye level shots are used. For artistic impression and better capture of the people in foreground without concerns of occluding the background, low-angle shots are used, especially for group photos as shown in FIG. 1(c).

A number of research groups have conducted insightful studies for understanding people interactions in images and videos, though with limited scope. Most of these approaches perform their analysis in the 2D camera space. Although these approaches demonstrated their effectiveness, their robustness is fundamentally limited by the 2D analysis paradigm and cannot handle the diversity in camera pose and people depths often seen in user generated Internet content.

Some recent works estimate 3D location of people using faces and use these locations to detect social interaction among people. In other works, location of faces in the 3D space around a camera wearing person are used to detect attention patterns. However, these approaches only attempt to detect a very limited set of human interactions and their 3D estimation cannot effectively handle the diversity of people in terms of age (big adults vs. small children), height (tall vs. short), and the diversity of peoples poses such as sitting, standing and standing on platforms. Additionally, these approaches do not take camera location and pose into account when analyzing people interactions, which can be an important cue about the intent of the shot.

The theory of Proxemics studies the correlation between human's use of space (proxemic behavior) and interpersonal communication. It provides a platform to understand the cues that are relevant in human interactions. Proxemics has been applied in the field of cinematography where it is used for optimizing the scene layout and the position of the camera with respect to the characters in the scene. We believe these concepts are relevant beyond cinematic visuals and pervade all types of images and videos captured by people. Inspired by the role of Proxemics in visual domain, we propose to analyze and recognize human interactions using the attributes studied in this theory.

In this paper, we propose a unified framework called 3D Visual Proxemics Analysis (VPA3D), for detecting and classifying people interactions from a single image. VPA3D first estimates people/face depths in 3D, then performs perspective rectification to map people locations from the scene space to the 3D space. Finally, a set of spatial and structural features are used to detect and recognize the six types of people interaction classes.

The proposed VPA3D approach surpasses state-of-the-art people configuration analysis in at least the following three aspects. First, PA3D uses 3D reasoning for robust depth estimation in the presence of age, size, height and human pose variation in a single image. Second, a set of shape descriptors derived from the attributes of Proxemics is used to capture type of people interaction in the eyes of each individual participant not only for robust classification but also for classification of individuals role in a visual proxeme. Additionally, the types of camera pose are used as a prior indicating possible intent of the camera-person who took the picture. Third, to characterize the human interaction space, we introduce visual proxemes; a set of prototypical patterns that represent commonly occurring people interactions in social events. The source of our visual proxemes is the NIST TRECVID Multimedia Event Detection dataset which contains annotated data for 15 high-level events. A set of 6 commonly occurring visual proxemes (shown in FIG. 1) are selected from keyframes containing groups of people. We train a discriminative classifier that classifies 3D arrangements of people into these visual proxemes and quantitatively evaluate the performance on this large, challenging dataset.

Figure 2:
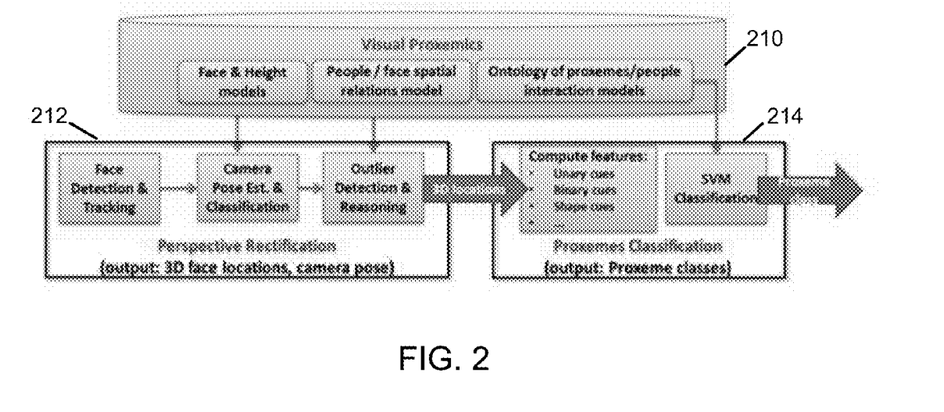
FIG. 2 is a simplified system diagram of at least one embodiment of a framework for 3D Visual Proxemic Analysis as disclosed herein.

Broadly, our 3D Visual Proxemic Analysis formulates a framework 200 that unifies three related aspects, as illustrated in the system pipeline (FIG. 2). First, we introduce visual proxemics 210 as a prior domain knowledge that guides our analysis and recognition of human interactions in images and videos. Then, we describe a novel perspective rectification algorithm 212 to estimate people/face depths in 3D and camera view from face detections in images. Finally, we categorize images into common types of social interactions (i.e., proxemes) in the visual proxeme classification 214 stage by combining the estimates of face positions and camera view with our knowledge of Visual Proxemics through spatial and structural features in the 3D space.

Proxemics is a branch of cultural anthropology that studies man's use of space as a way for nonverbal communication. In this work, we leverage the findings in Proxemics to guide us in our analysis and recognition of human interactions in visual media including images and videos. We call this Visual Proxemics and summarize our taxonomy of attributes in FIG. 3.

A key concept in Proxemics is "personal space" that associates inter-person distance with the relationships among people. It is categorized into four classes: "intimate distance" for close family, "personal distance" for friends, "social" distance for acquaintances and "public distance" for strangers. Additionally, people configuration needs to support the communicative factors such as physical contacts, touching, visual, and voice factors needed in an interaction. Based on these factors, we can see that certain types of the interactions will result in distinct shape configurations in 3D. For example, in FIG. 1a, to enable direct eye contact between any pair of participants in a group interaction, people align themselves in a semi-circular shape. In contrast, if two people are the focus of attention, as in FIG. 1d, we have multiple shape layers, where the two people at the center of attention share an intimate space, while the audience forms a distinct second layer in the background.

One area of interest is the application of proxemics to cinematography where the shot composition and camera viewpoint is optimized for visual weight. In cinema, a shot is either a long shot, a medium shot or a close-up depending on whether it depicts "public proxemics", "personal proxemics" or "intimate proxemic", respectively. Similarly, the camera viewpoint is chosen based on the degree of occlusion allowed in the scene. To assure full visibility of every character in the scene, a high-angle shot is chosen whereas for intimate scenes and closeups, an eye-level shot or low-angle shot is more suitable.

Figure 3:
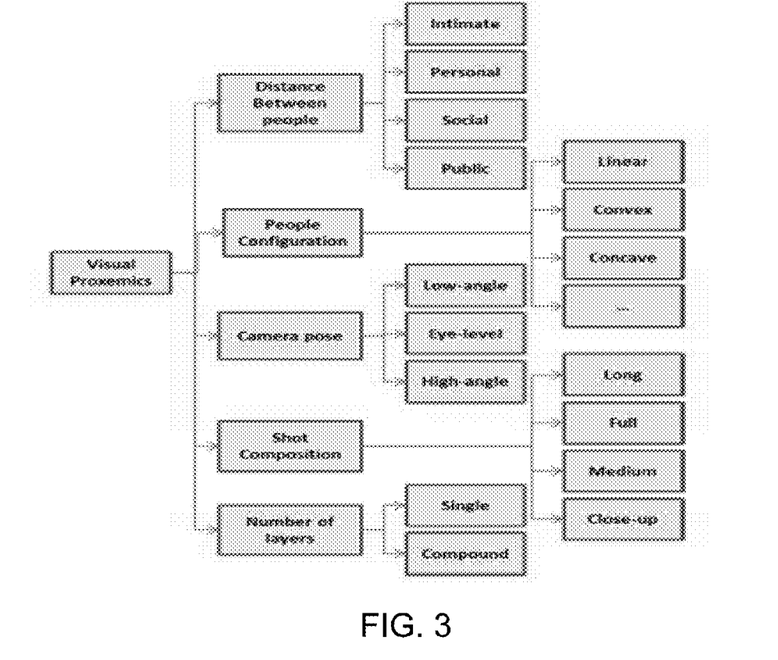
FIG. 3 is a simplified taxonomy of at least one embodiment of attributes for Visual Proxemics classification as disclosed herein.

From these attributes, we can see that each of the interactions specified in FIG. 1 can be described as a combination of several of these factors. For example, "Group Interaction" in FIG. 1(a) shows people within social distance in a single layer with a concave shape and is captured using high-angle, medium shot. In contrast, a "Family photo" in FIG. 1(b) is an eye-level, closeup shot of a family within intimate distance. The taxonomy of attributes shown in FIG. 3 are used to design features for Visual Proxemics classification, as discussed below.

Figure 5:
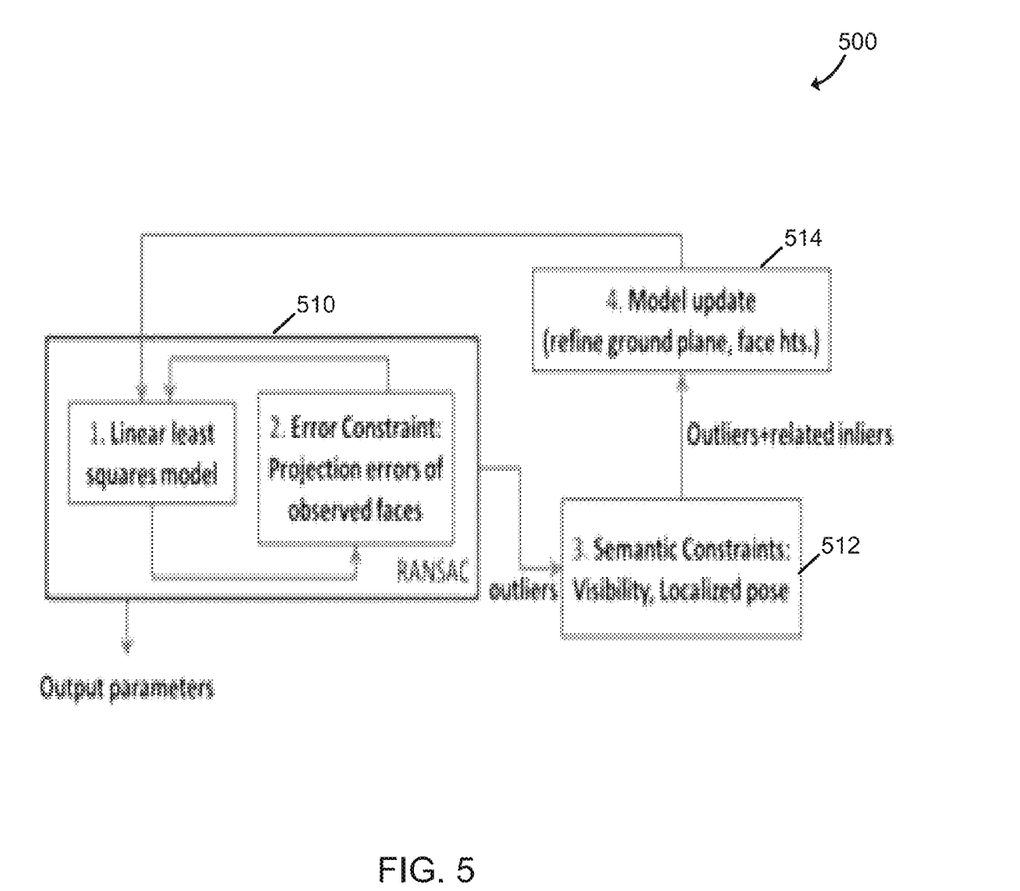
FIG. 5 is a simplified flow diagram of at least on embodiment of a perspective rectification module as disclosed herein.
Figure 6:
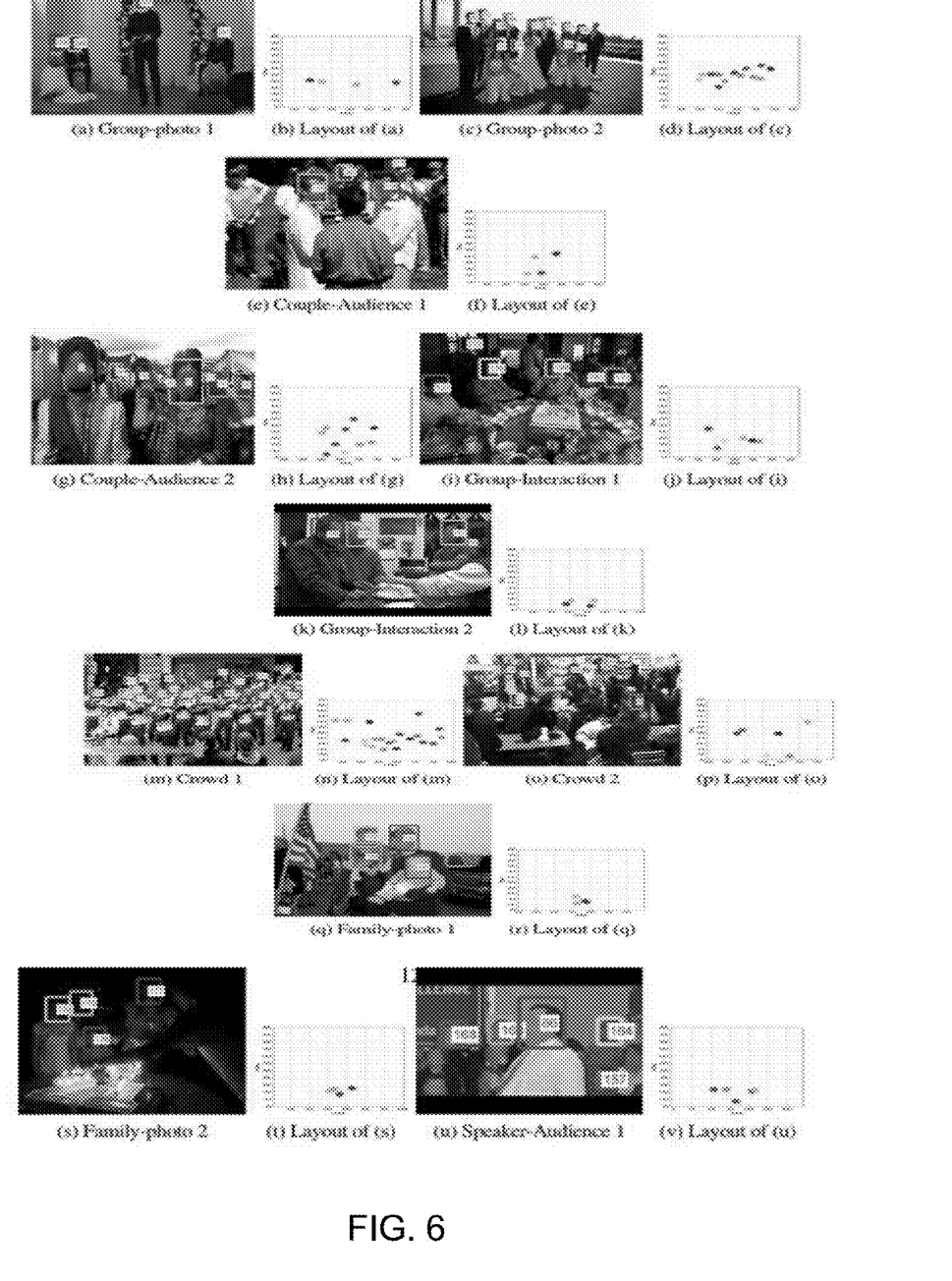
FIG. 6 illustrates a number of exemplary digital images (a),(c),(e),(g),(i),(k),(m),(o),(q),(s), and (u), annotated to depict inliers and outliers, and related plots (b),(d),(f),(h),(j),(l),(n),(p),(r),(t), and (v), as disclosed herein.

One embodiment of a method 500 that may be executed by, for example, the perspective rectification module 212 is illustrated in FIG. 5 and described below. Given the 2D face locations in an image, the goal is to recover the camera height and the face positions in the X-Z plane relative to the camera center. These parameters are computed by using an existing camera model and iterating between the following two steps—1.

Referring to block 510 of FIG. 5, initializing the model with coarse parameter estimates through a robust estimation technique. In addition to the parameters, we also detect outliers; face locations that do not fit the model hypothesis of uniform people heights and poses. This is described as the outlier detection step. 2. Referring to block 512 of FIG. 5, refining the parameter estimates by 3D reasoning about position of outliers in relation to the inliers based on domain constraints that relate people's heights and poses. This is called the outlier reasoning step. The model alternates between estimating camera parameters and applying positional constraints until convergence is reached. In the following sections, these two steps are described in detail.

This section describes an algorithm to estimate face depths, horizon line and camera height from 2D face locations in an image. Our model is based on the camera model described in, for example, D. Hoiem, A. Efros, and M. Hebert, Putting objects in perspective, IJCV, 0(1), 2008. We provide the derivation explicitly for the sake of completeness.

The coordinate transformation of a point using a typical pinhole camera model with uniform aspect ratio, zero skew and restricted camera rotation is given by, $$\begin{pmatrix} u^i \\ v^i \\ 1^i \end{pmatrix} = \frac{1}{z^w} \begin{pmatrix} f^w & 0 & u_c^w \\ 0 & f^w & v_c^w \\ 0 & 0 & 1 \end{pmatrix} \begin{pmatrix} 1 & 0 & 0 & 0 \\ 0 & \cos\theta_x^w & -\sin\theta_x^w & y_c^w \\ 0 & \sin\theta_x^w & \cos\theta_x^w & 0 \end{pmatrix} \begin{pmatrix} x^w \\ y^w \\ z^w \\ 1 \end{pmatrix},$$

Table 1: Statistics of our Visual Proxemes dataset based on NEST TRECVID corpus.

TABLE 1

Statistics of our Visual Proxemes dataset based on NIST TRECVID corpus [2].

| Proxeme type | # examples/# dataset | % dataset |
|---|---|---|
| Group photo | 345/3814 | 9.0% |
| Group interaction | 187/3814 | 4.9% |
| Couple and audience | 99/3814 | 2.6% |
| Crowd | 2448/3814 | 64.2% |
| Family photo | 148/3814 | 3.8% |
| Speaker and audience | 68/3814 | 1.8% |
| Undefined | 519/3814 | 13.6% |

TABLE 1-continued

Statistics of our Visual Proxemes dataset based on NIST TRECVID corpus [2].

| Proxeme type | # examples/# dataset | % dataset |
|---|---|---|
| High-angle | 918/3814 | 24% |
| Eye-level | 2722/3814 | 71% |
| Low-angle | 174/3814 | 5% | where a $(u^i, u^i)$ are its image coordinates, $(1^w, y^w, z^w)$ are its 3D coordinates, and $(u_c^w, v_c^w)$ are the coordinates of the camera center; where the superscript w indicates three-dimensional coordinates and i indicates image coordinates. We assume that the camera is located at $(x_c^w=0, z_c^w=0)$ and tilted slightly along x axis by $\theta_i^w$. $y_c^w$ is the camera height and $f^w$ is the focal length.

At this stage some simplifying assumptions are made—(a) faces have constant heights, (b) faces rest on ground plane, which implies $y^w=0$. The grounded position projects onto the bottom edge of the face bounding box in the image, $u^i=v_b^i$, $v^i=v_b^i$. (c) camera tilt is small, which implies $\cos\theta_x \sim 1$ and $\sin\theta_x \sim \theta_x \sim \tan\theta_x \sim (v_c^w-v_0^i)/f$, where $v_0^i$ is the height of the horizon line (also known as vanishing line) in image coordinates. By applying these approximations, we estimate $z^w$ and $x^w$ respectively, $$z^w = \frac{f^w y_c^w}{(v_b^i - v_0^i)} \quad x^w = \frac{y_c^w(u_b^i - u_c^w)}{(v_b^i - v_0^i)} \quad (1)$$

The estimated $z^w$ is the 3D distance in depth from the camera center $z_c^w$ and $x^w$ is the horizontal distance from the camera center $x_c^w$. Using these $(x^w, z^w)$ coordinates, we can undo the perspective projection of the 2D image and recover the perspective rectified face layout in the 3D coordinate system. Substituting the value of $z^w$ into the equation for $y^w$ and ignoring small terms we get, $$y^w(v_b^i - v_0^i) = y_c^w(v^i - v_b^i) \quad (2)$$

This equation relates the world height of a face ($y^w$) to its image height ($v^i - v_b^i$) through its vertical position in the image ($v_b^i$) and through two unknowns—the camera height ($y_c^w$) and the horizon line ($v_0^i$). In general, given N>=2 faces in an image, we have the following system of linear equations.

$$\begin{pmatrix} h_1 & h_w \\ \vdots & \\ h_N & h_w \end{pmatrix} \begin{pmatrix} y_c \\ v_0 \end{pmatrix} = \begin{pmatrix} h_w v_{b1} \\ \vdots \\ h_w v_{bN} \end{pmatrix}, \quad (3)$$

Thus, given an image with at least two detected faces, we can simultaneously solve for the two unknowns by minimizing the linear least squares error.

To get meaningful camera parameters, it is essential to filter out irregular observations that violate the model hypothesis. We use Random Sample Consensus (RANSAC) to reject these so-called outliers to get robust estimates. RANSAC is an iterative framework with two steps.

First, a minimal sample set (2 face locations) is selected and model parameters $(\hat{z}_w, \hat{y}_c, \hat{v}_0)$ are computed by least squares estimator (as explained above). Next, each instance of the observation set is checked for consistency with the estimated model. We estimate the face height in the image according to the model using $\hat{h}_i = h_w(v_b - \hat{v}_0)/\hat{y}_c$ and compute the deviation from be observed height using $e_M^i = \|h_i - \hat{h}_i\|$ to find the estimator error for that face. Outliers are instances whose summed errors over all the iterations exceed a predefined threshold.

Figure 4:
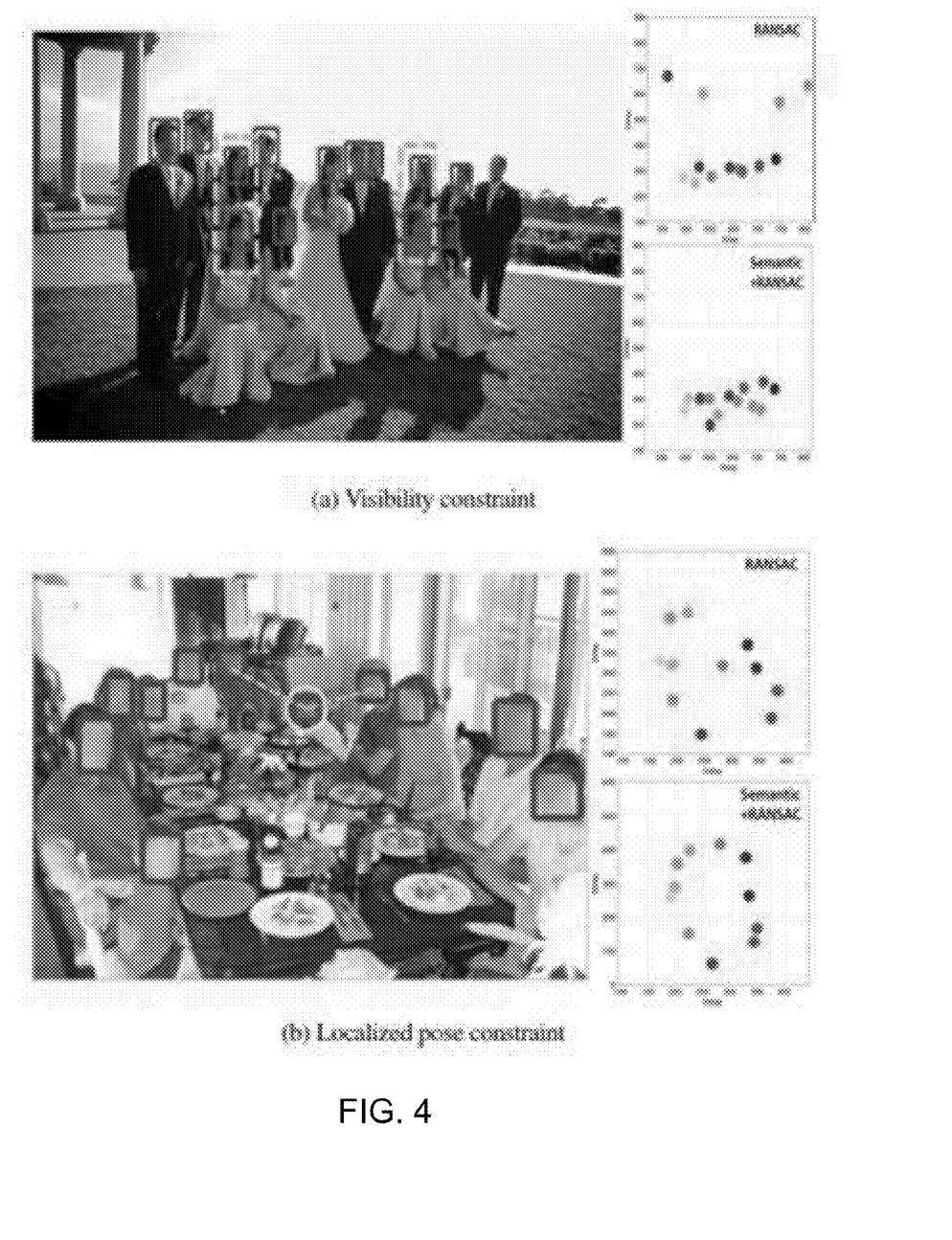
FIG. 4 illustrates digital images (a) and (b) annotated to depict outliers and inliers discovered through semantic constraints, and associated plots, as disclosed herein.

In this section, semantic constraints based outlier reasoning is discussed. Referring to FIG. 4, circled faces depict outliers and the connected faces show the related inliers discovered though semantic constraints. The linearized model is based on the hypothesis that all faces are (a) located on the same plane and (b) of the same size. However these assumptions do not always hold in practice. The faces that violate these assumptions are detected as outliers in the RANSAC step. Conventionally, outliers are treated as noisy observations and rejected from estimates. However, outlier faces may occur because of variations in face sizes and heights arising due to difference in age, pose (sitting versus standing) and physical planes of reference (ground level or on a platform). Hence, instead of eliminating them from consideration, we attempt to reason about them and restore them in our calculations. For doing this, we make use of semantics of Visual Proxemics to constrain the possible depth orderings of the outlier faces in the image. In particular, we consider two types of constraints visibility constraint and localized pose constraint, as explained below.

With regard to the visibility constraint, consider the pose configuration in FIG. 4(a). RANSAC estimates the sitting person's face to be an outlier because it violates the common ground plane assumption (assumption (b) in the linear model). However, we can easily see that for the sitting person is visible, she has to be in front of the standing person. We formulate this visibility constraint as follows—The only way for two faces to be visible at the same horizontal location is if the lower face is closer in depth than the face above it. We formulate this constraint by the following inequality. ($^2$(x=0, y=0) is the upper left corner in image space and z increases upwards).

$$\delta(x_i - x_i^*)(y_i - y_i^*)(\hat{z}_w - \hat{z}_w) \leq 0, \quad (4)$$

where $\delta(a-b)$ is 1 when a=b and $\hat{z}_w$ is the RANSAC estimate of depth. For each outlier in the image, we determine if it shares a visibility constraint with any of the inliers and maintain an index of all such pairs. Each such (outlier, inliers) pair is assumed to share a common ground plane (are standing/sitting on the same ground level). Based on this assumption the height estimates of the outliers are refined.

The localized pose constraint assumes that the people who are physically close to each other also share the same pose. Consider the group photo in FIG. 4(b). RANSAC estimation (top plot) detects the child's face location as an outlier and incorrectly estimates its depth because of the height difference from the remaining members of the group. Now, if we assume that the inliers that are physically close to the outlier in the world also have a similar pose, then we can localize the ground plane level at the outlier based on the face locations of the neighboring inliers. This can help us fix the depth of the outlier without concerns about its vertical position in the image (as shown in the bottom plot).

Formally, let $N_{x_j^{out}}^{in}$ represent the inlier neighbors of outlier instance j along horizontal coordinates in the image. If the difference in the face size of the outlier to its inlier neighbors is within a threshold, then we can fix the depth of the outlier within the vicinity of the neighboring inliers. Formally, this constraint is represented as $$\left(h_j^i - \sum h_{N_{x_j^{out}}^{in}}^i / N_{x_j^{out}}^{in}\right) < \epsilon_h^i \Rightarrow \quad (5)$$

$$\left(z_j^w - \sum z_{N_{x_j^{out}}^{in}}^w / N_{x_j^{out}}^{in}\right) < \epsilon_z^w \quad (6)$$

For each outlier in the image, we perform this constraint test in determine (outlier, inliers) pairs that satisfy the localized pose constraint. These are used to refine the height estimates of the outliers in the following section.

Referring to block 514 of FIG. 5, the model is updated in accordance with the description below. The height estimates of the outliers are refined using the semantically constrained set of inliers. Specifically, we make use of a piecewise constant ground plane assumption in the image to estimate the outlier heights in the world. By assuming that the outliers are located at the same level as the related inliers, the world height ($h^w$) of the outliers can calculated in proportion to the inliers. Let $B_j^{out}$ is the body height of an outlier and $\hat{G}_k^{in}$ be the ground plane approximation for a neighboring inlier. The ground level is calculated by translating the vertical position of the face by a quantity proportional to the image height (we assume face size is 7 times the body size). The body height of the outlier is based on the average ground plane estimated from its inliers. The face height is then calculated as a fraction of the estimated body height.

$$\hat{G}_k^{in} = v_{bk}^i + c * h_k^i, \quad (7)$$

$$B_j^{out} = \frac{\sum_{k \in (in, N(j))} \hat{G}_k^{in}}{\sum_{k \in (in, N(j))}} - v_{bj}, \quad h_j^{out} = B_j^{out} / B_k^{in} \quad (8)$$

The new height ratios are inputs to the next round of RANSAC step that produce new estimates of face depths and camera heights. We perform this iteration 3-4 times in our model.

To capture the spatial arrangement of people, we construct features based on the attribute taxonomy of Visual Proxemics as described herein. Specifically, our features are designed to reflect the information about the following attributes—1) Distance, 2) Camera pose, 3) Shape, 4) Shot composition, and 5) Shape layers.

With regard to shape cues, we find the Convex Hull and the Minimum Spanning Tree (MST) for the face locations in X-Z plane. From these structures, we measure statistics that capture the overall extent and orientation of the shape. We compute the volume of the convex hull which indicates the spread of the shape. To measure directional spread, we compute the eccentricity of its envelope ellipse. We also calculate the degree of Minimum Spanning Tree which captures of overall structure of the shape. High branching indicates a compact shape while low branching indicates a linear shape e.g., in a group photo.

With regard to shot composition cues, we find the numerosity of people and their visual distribution in the scene. Specifically, we use the convex hull and find the number of points inside the hull as well as the ratio between inside and outside points. Values<<1 indicate high spread, e.g., as in a crowd. We also measure the visual distribution using three measures—a) Horizontal skew: Using the extremal face locations along X direction as anchors, we find their center and compute standard deviation along X axis. b) Depth skew: Computes the standard deviation of shape along Z axis, and c) Centeredness, which combines the deviations along X and Z axis.

With regard to distance cues, we measure the average Euclidean distance between pairs of faces in the X-Z plane. Specifically, we look at two types of distances—a) All pairs distance, which measures the spacing between each pair of faces, normalized by the image diagonal. It indicates the overall interpersonal distance in a group. b) Nearest neighbor distance which is calculated between faces along the Minimum Spanning Tree. It measures the localized interpersonal distances.

With regard to camera pose cues, the camera height is quantized into three levels—low-angle, eye-level and high-angle. It is indicative about the intent of the shot.

With regard to shape layer cues, we find if people are arranged in a single group or in separate subgroups based on within and between layer distances and orientations. Specifically, we look at a) inter face affinity which is measured as follows. For each face location, find its pairwise distance to all other faces and normalize by the maximum distance. Then, make the pairwise distances symmetric by averaging distances between each pair. Partition the affinity matrix to discover subgroups. b) Inter face orientation, in which we compute angles between pairs of faces along the MST with reference to X axis.

The raw features measure different types of statistics and thus lie on different scales. To fit the distribution of each feature within a common scale, we use a sigmoid function that converts feature values into probabilistic scores between zero and one. Additionally, some of these features are meaningful within a certain range of values. Shifting a sigmoid function according to the threshold value allows soft thresholding. If σ is the threshold for feature x and c is the weight, we get the following expression for the sigmoid function.

$$p(x) = \begin{cases} \dfrac{1}{1+e^{-c*(x-\sigma)}}, & \text{Threshold } x > \sigma \\ \dfrac{1}{1+e^{-c*(\sigma-x)}}, & \text{Threshold } x <= \sigma, \end{cases}$$

To compute an aggregate feature from all the faces in an image, we consider the mean and variance values of each feature and then fit the sigmoid function to re-adjust the values. The feature corresponding to an image is a concatenated vector of these probability scores.

In this paper we present 3D Visual Proxemics Analysis, a framework that integrates Visual Proxemics with 3D arrangements of people to identify typical social interactions in Internet images. Our results demonstrate that this unified approach surpasses the state-of-the-art both in 3D estimation of people layout from detected faces as well as in classification of social interactions. We believe that inclusion of semantics allowed us to estimate better 3D layout than the purely statistical approaches. A better 3D geometry, in turn, allowed us to define features informed by Proxemics that improved our semantic classification. In future, we hope to delve deeper into this synergistic approach by adding other objects and expanding our semantic vocabulary of Visual Proxemics.

Embodiments of the disclosure utilize algorithmic proxemic analysis of image to provide a variety of functions and in a variety of systems/applications, including the following examples.

In one example, the present disclosure describes a system that uses detected objects of known dimension to infer 3D arrangement of the objects, camera parameters and 3D environments (e.g. ground plane) in a single image or in a video sequence.

In another example, the present disclosure describes a system that uses faces, people, vehicle to infer 3D arrangement of the objects, camera parameters and 3D environments (e.g. ground plane) in a single image or in a video sequence.

In another example, the present disclosure describes a system that uses 3D arrangement of faces, people or vehicles computed from a single image or in a video sequence to infer their interactions, such as whether or not they are facing each other, whether or not they are moving towards each other, whether or not they can reach or contact each other, etc.

In another example, the present disclosure provides a system that uses detected objects of known attributes, their configurations and their poses to infer region of interest additional objects of interest. E.g. from gaze, hand locations, hand and body poses and configurations, the system identifies regions or locations of objects being manipulated by a person or persons in an image or a video.

In another example, the present disclosure provides a system that uses detected objects of known attributes and their configuration to infer region of interest additional objects of interest for a given event or activities that a user would like to search or detect. E.g. from gaze and hand locations and configurations, the system identifies regions or locations as the focus of attention for classification in order to distinguish two similar events or activities based on what objects being manipulated by a person or persons in an image or a video.

In another example, the present disclosure provides a system that uses detected objects of known attributes and their configuration to infer the pose of objects of interest. E.g. from computed face pose, the system will bias on the location and potential body pose of the person.

In another example, the present disclosure provides a system that uses detected objects of known attributes and their visibility to infer the type of the layout of the scene and the layout and existence of the objects. For example, if a person is detected and his/her lower body is not visible, the system will infer and bias (through a prior distribution) the existence of a table, counter or other occluding objects. Another example, from the foot location of a detected person, the system can determine the ground location, and location of tables and working space that the person can interact with.

In another example, the present disclosure provides an information retrieval system that automatically converts a user query into a set of events, actions, objects, object relationships, regions of interest related to objects and their interactions in order to retrieve the query results.

The disclosed approach has several advantages. First, it can accurately estimate relative distances and orientations between people in 3D. Second, it encodes spatial arrangements of people into a richer set of shape descriptors than afforded in 2D. Our 3D shape descriptors are invariant to camera pose variations often seen in web images and videos. The proposed approach also estimates camera pose and uses it to capture the intern of the photo. To achieve an accurate 3D people layout estimation, we develop an algorithm that robustly fuses semantic constraints about human interpositions into a linear camera model. This enables our model to handle large variations in people size, heights (e.g. age) and poses. An accurate 3D layout also allows us to construct features informed by Proxemics that improves our semantic classification. To characterize the human interaction space, we introduce visual proxemes; a set of prototypical patterns that represent commonly occurring social interactions in events. We train a discriminative classifier that classifies 3D arrangements of people into visual proxemes and quantitatively evaluate the performance on a large, challenging dataset.

This disclosure is to be considered as exemplary and not restrictive in character, and all changes and modifications that come within the spirit of the disclosure are desired to be protected.

The invention claimed is:

1. A method for recognizing a human interaction depicted in a two-dimensional image, the method comprising, algorithmically:
   - detecting a plurality of human face locations of people depicted in the image;
   - determining a three-dimensional spatial arrangement of the people depicted in the image based on the detected human face locations;
   - performing a proxemics-based analysis of the three-dimensional spatial arrangement of the people depicted in the image, wherein the proxemics-based analysis identifies cues in the three-dimensional spatial arrangement that are relevant to human interactions; and
   - classifying the image as depicting a type of human interaction using visual proxemes, wherein the visual proxemes comprise a set of prototypical patterns that represent commonly occurring people interactions;
   - wherein the image is created by a camera positioned at a camera viewpoint relative to a reference plane, and the method comprises estimating the camera viewpoint and using the estimated camera viewpoint to classify the image.

2. The method of claim 1, comprising detecting, in the image, a person standing in front of another person by applying a proxemics-based visibility constraint.

3. The method of claim 1, comprising detecting, in the image, a child and an adult by applying a proxemics-based localized pose constraint.

4. The method of claim 1, comprising classifying the image as depicting a group interaction, a family photo, a group photo, a couple with an audience, a crowd scene, or a speaker and an audience.

5. The method of claim 1, comprising detecting a plurality of feature cues in the image, wherein each of the feature cues relates to a proxemics-based attribute.

6. The method of claim 5, wherein the plurality of feature cues comprises a shape cue that indicates a shape of the spatial arrangement of the detected face locations, a shot composition cue that indicates a visual distribution of the people depicted in the image, a distance cue that measures distances between the detected face locations in the image, a camera pose cue that estimates the height of the camera used to capture the image in relation to the people depicted in the image relative to a ground plane, and a shape layer cue that indicates whether the people depicted in the image are arranged in a single group or in separate subgroups.

7. The method of claim 1, comprising creating a collection of classified images by repeating the detecting, determining, performing, and classifying for a plurality of two-dimensional images and arranging the classified images in a collection according to human interaction type.

8. The method of claim 7, comprising searching the collection using search criteria including a human interaction type.

9. The method of claim 7, comprising retrieving an image from the collection based on a human interaction type.

10. A method for recognizing a human interaction depicted in a two-dimensional image, the method comprising, algorithmically:
    - detecting a plurality of human face locations of people depicted in the image;
    - determining a three-dimensional spatial arrangement of the people depicted in the image based on the detected human face locations;
    - performing a proxemics-based analysis of the three-dimensional spatial arrangement of the people depicted in the image, wherein the proxemics-based analysis identifies cues in the three-dimensional spatial arrangement that are relevant to human interactions;
    - classifying the image as depicting a type of human interaction using visual proxemes, wherein the visual proxemes comprise a set of prototypical patterns that represent commonly occurring people interactions; and
    - classifying a camera viewpoint as a high-angle viewpoint, an eye-level viewpoint, or a low-angle viewpoint.

11. A method for recognizing a human interaction depicted in a two-dimensional image, the method comprising, algorithmically:
    - detecting a plurality of human face locations of people depicted in the image;
    - determining a three-dimensional spatial arrangement of the people depicted in the image based on the detected human face locations;
    - performing a proxemics-based analysis of the three-dimensional spatial arrangement of the people depicted in the image, wherein the proxemics-based analysis identifies cues in the three-dimensional spatial arrangement that are relevant to human interactions;
    - classifying the image as depicting a type of human interaction using visual proxemes, wherein the visual proxemes comprise a set of prototypical patterns that represent commonly occurring people interactions; and
    - analyzing the plurality of detected human face locations using a linear camera model, identifying a face location that does not fit the linear camera model as an outlier, identifying a face location that fits the linear camera model as an inlier, determining the position of the outlier in relation to the inlier, and classifying the image as depicting a type of human interaction based on the position of the outlier in relation to the inlier.

12. The method of claim 11, comprising analyzing the position of the outlier in relation to the inlier using one or more visual proxemics-based constraints.

13. A method for recognizing a human interaction depicted in a two-dimensional image, the method comprising, algorithmically:
    - detecting a plurality of human face locations of people depicted in the image;
    - determining a three-dimensional spatial arrangement of the people depicted in the image based on the detected human face locations;
    - performing a proxemics-based analysis of the three-dimensional spatial arrangement of the people depicted in the image, wherein the proxemics-based analysis identifies cues in the three-dimensional spatial arrangement that are relevant to human interactions;
    - classifying the image as depicting a type of human interaction using visual proxemes, wherein the visual proxemes comprise a set of prototypical patterns that represent commonly occurring people interactions; and
    - alternating between estimating a camera parameter of the camera used to create the image and applying proxemics-based constraints to the three-dimensional spatial arrangement of the human face locations detected in the image to identify the type of human interaction depicted by the image.

* * * * *